(12) United States Patent
Chen et al.

(10) Patent No.: US 12,437,939 B2
(45) Date of Patent: Oct. 7, 2025

(54) METHOD FOR PRELITHIATING SOFT CARBON NEGATIVE ELECTRODE AND ASYMMETRIC LITHIUM-ION SUPERCAPACITOR

(71) Applicant: CPC CORPORATION, TAIWAN, Kaohsiung (TW)

(72) Inventors: Yan-Shi Chen, Chiayi (TW); Guo-Hsu Lu, Chiayi (TW); Chi-Chang Hu, Chiayi (TW); Chih-Yu Ku, Chiayi (TW); Tien-Yu Yi, Chiayi (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 425 days.

(21) Appl. No.: 18/154,765

(22) Filed: Jan. 13, 2023

(65) Prior Publication Data
US 2024/0170230 A1   May 23, 2024

(30) Foreign Application Priority Data

Nov. 11, 2022   (TW) .................................. 111143226

(51) Int. Cl.
| | |
|---|---|
| *H01G 11/86* | (2013.01) |
| *H01G 11/06* | (2013.01) |
| *H01G 11/32* | (2013.01) |
| *H01G 11/50* | (2013.01) |
| *C25D 5/54* | (2006.01) |

(52) U.S. Cl.
CPC ............. *H01G 11/86* (2013.01); *H01G 11/06* (2013.01); *H01G 11/32* (2013.01); *H01G 11/50* (2013.01); *C25D 5/54* (2013.01)

(58) Field of Classification Search
CPC ........ H01G 11/86; H01G 11/06; H01G 11/32; H01G 11/34; H01G 11/14; H01G 11/38; H01G 11/50; H01G 11/58
See application file for complete search history.

(56) References Cited

U.S. PATENT DOCUMENTS

| | | | |
|---|---|---|---|
| 2013/0045427 A1* | 2/2013 | Zhamu .............. | H01M 10/0525 977/734 |
| 2014/0313635 A1* | 10/2014 | Kim ....................... | H01G 11/06 361/502 |

(Continued)

*Primary Examiner* — Scott B Geyer
(74) *Attorney, Agent, or Firm* — HSML P.C.

(57) ABSTRACT

A method for prelithiating a soft carbon negative electrode includes the steps of: disposing the soft carbon negative electrode and a lithium metal piece spaced apart from each other with a lithium-containing electrolyte present therebetween; prelithiating the soft carbon negative electrode at a first constant C-rate until a voltage thereof is reduced to a first predetermined voltage not greater than 0.3 V vs. Li/Li$^+$, the first constant C-rate being not greater than 5 C; prelithiating the soft carbon negative electrode at a second constant C-rate until the voltage thereof is reduced to a second predetermined voltage lower than the first predetermined voltage, the second constant C-rate being not greater than 0.2 C and being less than the first constant C-rate; and prelithiating the soft carbon negative electrode at a prelithiation constant voltage which is not greater than the second predetermined voltage, thereby completing prelithiation of the soft carbon negative electrode.

9 Claims, 9 Drawing Sheets

(56) References Cited

U.S. PATENT DOCUMENTS

| | | | |
|---|---|---|---|
| 2015/0287546 A1* | 10/2015 | Xi | H01G 11/38 |
| | | | 29/25.41 |
| 2016/0111228 A1* | 4/2016 | Okuno | H01G 11/52 |
| | | | 320/167 |
| 2017/0062140 A1* | 3/2017 | Zheng | H01G 11/86 |
| 2017/0084401 A1* | 3/2017 | Xing | H01G 11/32 |
| 2017/0301485 A1* | 10/2017 | Cao | H01G 11/06 |
| 2018/0062159 A1* | 3/2018 | El-Kady | H01M 4/525 |
| 2018/0190439 A1* | 7/2018 | Zhamu | H01G 11/34 |
| 2018/0212245 A1* | 7/2018 | Isii | H01M 10/0585 |
| 2018/0233297 A1* | 8/2018 | Zhamu | H01G 11/74 |
| 2019/0006675 A1* | 1/2019 | Cheng | H01M 4/133 |
| 2019/0006721 A1* | 1/2019 | Zhamu | H01M 10/3954 |
| 2019/0108948 A1* | 4/2019 | Chai | H01G 11/06 |
| 2020/0321612 A1* | 10/2020 | Chae | H01M 10/0525 |
| 2021/0075001 A1* | 3/2021 | Oleshko | H01M 50/446 |
| 2021/0091368 A1* | 3/2021 | House | H01M 4/525 |
| 2021/0104369 A1* | 4/2021 | Gangopadhyay | H01G 11/34 |
| 2021/0111391 A1* | 4/2021 | House | H01M 4/139 |
| 2021/0351413 A1* | 11/2021 | Zhamu | H01M 50/531 |
| 2022/0328256 A1* | 10/2022 | Cordova | H01M 4/405 |
| 2023/0411687 A1* | 12/2023 | Kong | H01G 11/10 |

* cited by examiner

METHOD FOR PRELITHIATING SOFT CARBON NEGATIVE ELECTRODE AND ASYMMETRIC LITHIUM-ION SUPERCAPACITOR

CROSS-REFERENCE TO RELATED APPLICATION

This application claims priority to Taiwanese Invention Patent Application No. 111143226, filed on Nov. 11, 2022.

FIELD

The disclosure relates to a prelithiation method, and more particularly to a method for prelithiating a soft carbon negative electrode, and a lithium-ion supercapacitor including the same. In addition to the lithium-ion supercapacitor, the soft carbon negative electrode may be used in a lithium-ion battery.

BACKGROUND

Electrical double-layer capacitors (EDLCs, also known as a type of symmetric supercapacitors) have relatively low working voltages and energy densities thereof depending on potential windows of decomposition of electrolytes present therein. The dissimilar configuration of the positive and negative electrodes in supercapacitors forms the asymmetric supercapacitors which have improved working voltages. Considering that $E=CV^2/2$, (where E is energy stored in a supercapacitor; C is cell capacitance of the supercapacitor; and V is cell voltage across the supercapacitor), use of various combinations of electrode materials to form asymmetric cells and use of various electrolytes might further enlarge the cell voltages, resulting in enhanced energy storage performances of the asymmetric supercapacitors.

In recent years, hybrid capacitors, such as lithium-ion capacitors (LiCs), have been proposed to improve energy densities of supercapacitors by using the asymmetric design (i.e., dissimilar electrode materials are used for the negative and positive electrodes in each of the hybrid capacitors).

Lithium-ion capacitors mainly adopt activated carbon as a positive electrode material, and materials that allow insertions/extraction (intercalation/deintercalation) of lithium ions as the negative electrode materials. Examples of such negative electrode materials include graphite, hard carbon, soft carbon, and lithium titanate. In comparison with EDLCs, lithium-ion capacitors exhibit the charging-discharging curves with cell voltages significantly higher than 1 V, as a result of a non-faradaic current on activated carbon in positive electrodes thereof (i.e., adsorption/desorption of anions) and a faradaic reaction of lithium ions on negative electrodes thereof (i.e., intercalation/deintercalation of lithium ions which have a voltage close to 0 V vs. $Li/Li^+$). Such asymmetric electrodes allow lithium-ion capacitors to have working voltages of approximately 4.0 V, which is much higher than those of EDLCs (approximately 2.7 V).

However, power densities and cycle life of such asymmetric structures depend on properties of negative electrode materials. The intercalation/deintercalation of lithium ions in the aforementioned negative electrode materials has a voltage close to 0 V vs. $Li/Li^+$, and forms a solid electrolyte interphase (SEI) membrane on the surface of the negative electrode materials. Therefore, the negative electrode materials are subjected to a prelithiation process before being used as negative electrodes of the lithium-ion capacitors.

SUMMARY

Therefore, an object of the disclosure is to provide a method for prelithiating a soft carbon negative electrode and an asymmetric lithium-ion supercapacitor including the same that can alleviate at least one of the drawbacks of the prior art.

In a first aspect of the disclosure, the method for prelithiating the soft carbon negative electrode includes the steps of:
a) disposing the soft carbon negative electrode and a lithium metal piece spaced apart from each other such that a lithium-containing electrolyte is present therebetween;
b) prelithiating the soft carbon negative electrode at a first constant C-rate until a voltage of the soft carbon negative electrode is reduced to a first predetermined voltage that is not greater than 0.3 V vs. $Li/Li^+$, the first constant C-rate being not greater than 5 C;
c) after step b), prelithiating the soft carbon negative electrode at a second constant C-rate until the voltage of the soft carbon negative electrode is reduced to a second predetermined voltage that is lower than the first predetermined voltage, the second constant C-rate being not greater than 0.2 C and being less than the first constant C-rate; and
d) after step c), prelithiating the soft carbon negative electrode at a prelithiation constant voltage which is not greater than the second predetermined voltage, thereby completing prelithiation of the soft carbon negative electrode.

In a second aspect of the disclosure, an asymmetric lithium-ion supercapacitor includes a soft carbon negative electrode, a positive electrode, an electrolyte and a membrane. The soft carbon negative electrode has been prelithiated by the aforementioned method. The positive electrode is spaced apart from the soft carbon negative electrode. The electrolyte is disposed between the soft carbon negative electrode and the positive electrode. The membrane is disposed between the soft carbon negative electrode and the positive electrode, and allows the electrolyte to pass therethrough.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
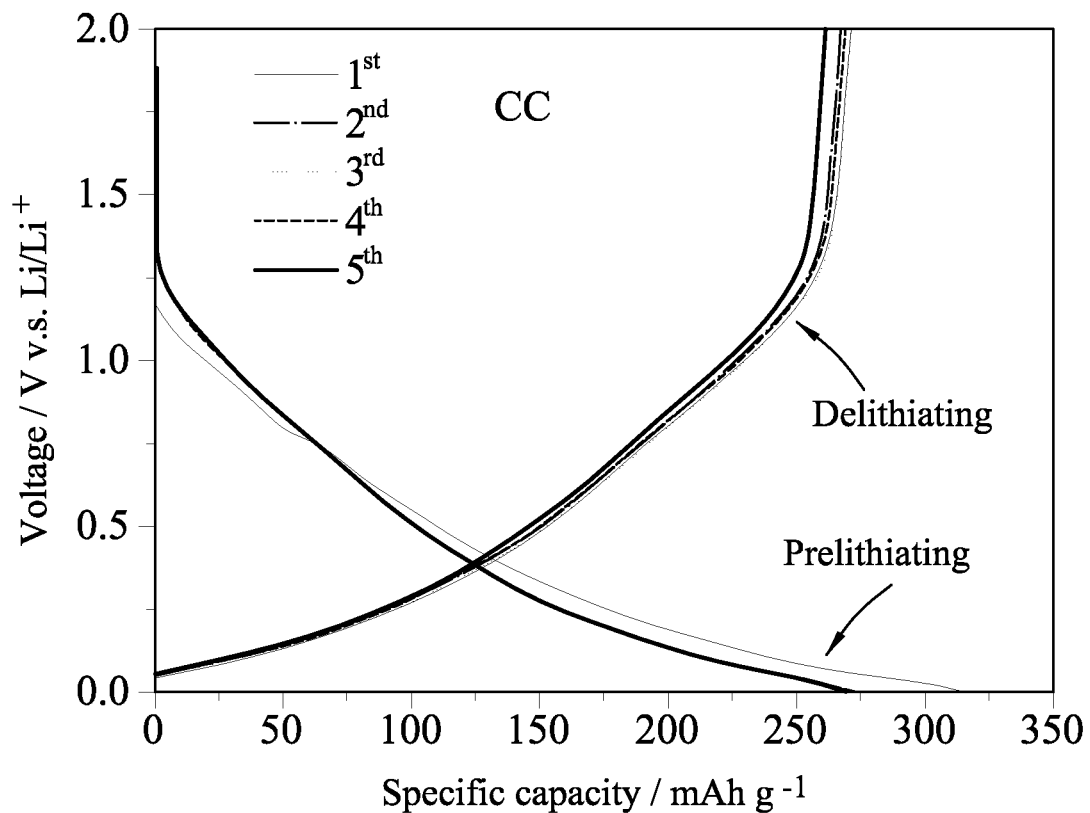
FIG. 1 is a plot of voltage against specific capacity of a soft carbon negative electrode that is prelithiated by applying a constant current thereto.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
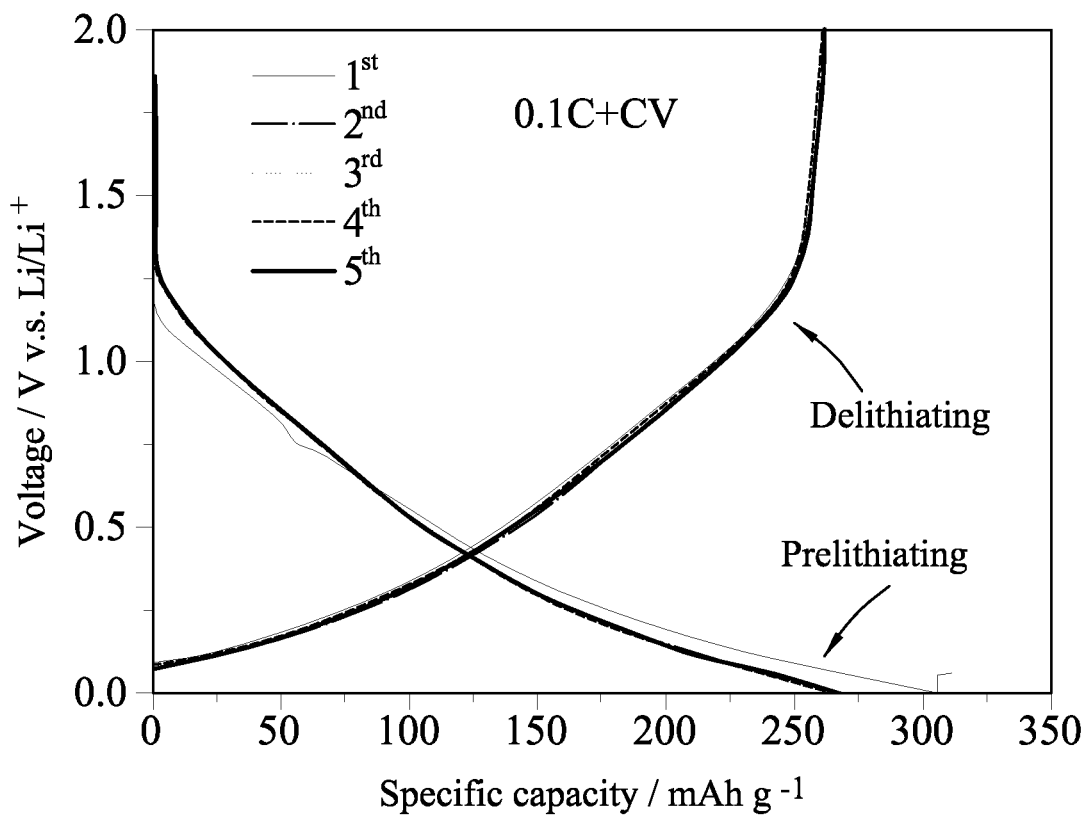
FIG. 2 is a plot of voltage against specific capacity of another soft carbon negative electrode that is prelithiated by applying a constant current (at a C-rate of 0.1 C), followed by a constant voltage thereto.

Different prelithiating processes are first discussed to evaluate elements that are to be included during prelithiating a soft carbon negative electrode. FIGS. 1 and 2 show two different prelithiating processes of two identical soft carbon negative electrodes. For each of the prelithiating processes shown in FIGS. 1 and 2, firstly, the soft carbon negative electrode and a lithium metal piece are arranged to be spaced apart from each other such that a lithium-containing electrolyte is presented therebetween. Then, the soft carbon negative electrode and the lithium metal piece (serving as a Li/Li$^+$ reference electrode) are subjected to a plurality of cycles of prelithiating/delithiating processes, thereby obtaining a respective prelithated soft carbon negative electrode. The prelithiating process corresponding to FIG. 1 includes, during each prelithiating, prelithiating the soft carbon negative electrode with a constant current (denoted as "CC"). The prelithiating process corresponding to FIG. 2 includes, during each prelithiating, prelithiating the soft carbon negative electrode with a constant current at a constant C-rate of 0.1 C, followed by a constant voltage (CV). That is, the prelithiating process shown in FIG. 2 may be represented by the expression:

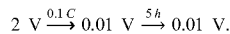

In each of the aforementioned prelithiating processes, a voltage (the y-axis) of the soft carbon negative electrode (measured with reference to the Li/Li$^+$ reference electrode) against a specific capacity thereof is shown. Before each prelithiating process, the soft carbon negative electrode may have an initial voltage greater than 1.5 V vs. Li/Li$^+$ and not greater than 2 V vs. Li/Li$^+$. 5 cycles of prelithiating/delithiating are shown in each of FIGS. 1 and 2. Delithiation capacities (Cs) and coulombic efficiencies of the two prelithiated soft carbon negative electrodes are shown in Table 1.

Referring to Table 1 and FIG. 1, for the prelithiating process that includes only prelithiating the soft carbon negative electrode with the constant current (CC), an irreversible capacity loss of the soft carbon negative electrode is found in the 1$^{st}$ and even after the 2$^{nd}$ cycle; a delithiation capacity of the soft carbon negative electrode gradually decreases as a number of cycle increases, and a coulombic efficiency of the soft carbon negative electrode does not level until reaching the 5$^{th}$ cycle. In addition, the delithiating curves for all 5 cycles do not overlap, especially at end portions of the delithiation curves. This shows that, formation of a solid electrolyte interphase (SEI) on a surface of the soft carbon negative electrode does not complete until approximately the 4$^{th}$, or the 5$^{th}$ cycle of prelithiating/delithiating of the soft carbon negative electrode.

Referring to Table 1 and FIG. 2, for the prelithiating process that includes prelithiating the soft carbon negative electrode at a constant C-rate of 0.1 C followed by a constant voltage (CV), an irreversible capacity loss of the soft carbon negative electrode is found merely in the 1$^{st}$ cycle, and is hardly observed in each of the 2$^{nd}$, 3$^{rd}$, 4$^{th}$, 5$^{th}$ cycles. Delithiation capacities of the soft carbon negative electrode of all 5 cycles are similar, and a coulombic efficiency of the soft carbon negative electrode levels at the 3$^{rd}$ cycle. In addition, the delithiating curves for all 5 cycles overlap with one another and are stable. Therefore, formation of the SEI is completed at the 1$^{st}$ cycle of prelithiating of the prelithiating process (in which the soft carbon negative electrode is prelithiated by a constant current (CC) mode followed by a constant voltage (CV) method), which is conducive for shortening a time period of the prelithiating process. Thus, a step of prelithiating a soft carbon negative electrode with a constant voltage (CV) is included in a method for prelithiating the soft carbon negative electrode in the following discussion.

Figure 3:
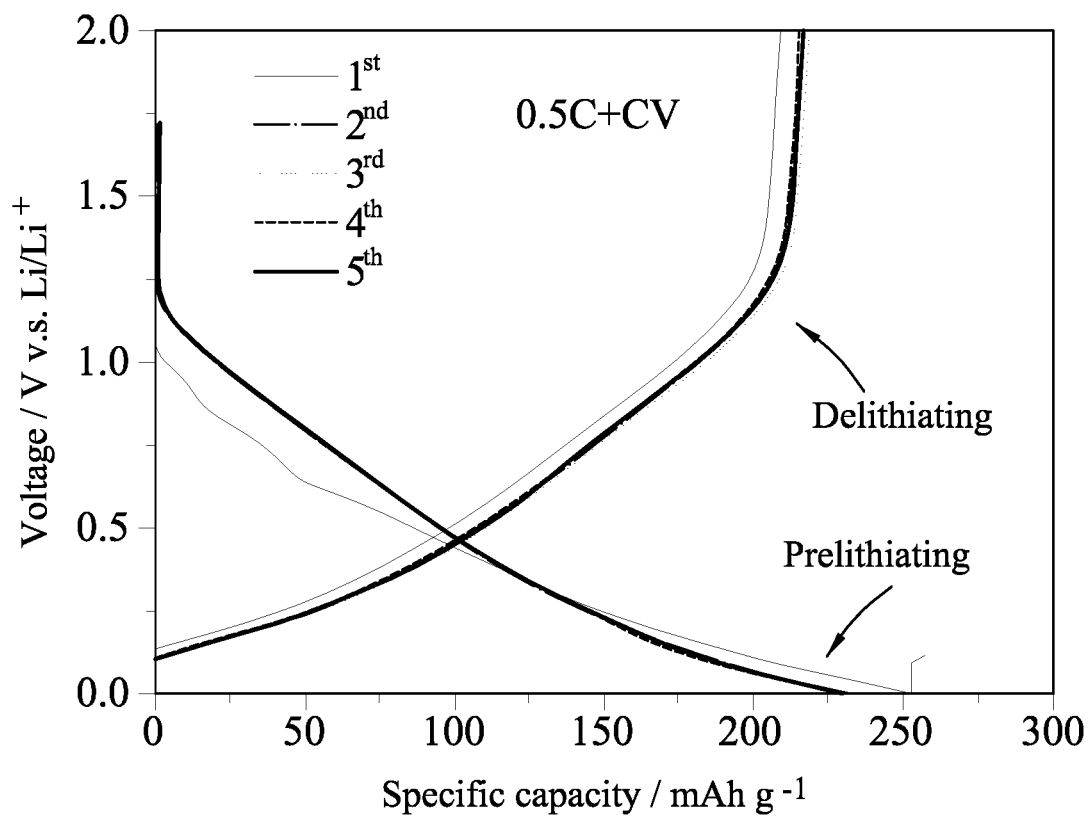
FIG. 3 is a plot of voltage against specific capacity of some other soft carbon negative electrode that is prelithiated by applying a constant current (at a C-rate of 0.5 C), followed by the constant voltage thereto.

FIG. 3 shows another prelithiating process similar to that shown in FIG. 2, except that for the prelithiating process shown in FIG. 3, the constant current is applied at a constant C-rate of 0.5 C. The prelithiating process shown in FIG. 3 may be represented by the expression:

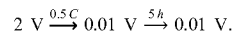

From the results shown in FIG. 2, it is known that prelithiating the soft carbon negative electrode with a constant voltage (CV) allows complete formation of the SEI. However, referring to Table 1 and FIG. 3, prelithiating the soft carbon negative electrode at a higher constant current (i.e., prelithiating the soft carbon negative electrode with a higher C-rate, followed by prelithiating with the constant voltage) does not help in completing prelithiation of the soft carbon negative electrode in a shorter time period. The coulombic efficiency of the soft carbon negative electrode prelithiated at 0.5 C remains fluctuating for a few cycles, and prelithiation of the soft carbon negative electrode does not complete. This could be due to that during prelithiating the soft carbon negative electrode at a constant C-rate (i.e., during the voltage reducing from 2 V to 0.01 V), in a relatively low potential range (e.g., 0.3 V to 0.01 V), the lithium-ion intercalation capacity of the soft carbon negative electrode is relatively high and lithium ions migrate into the soft carbon negative electrode at a relatively slow rate. Therefore, when the soft carbon negative electrode is prelithiated at a relatively high constant C-rate in a relatively high potential range, followed by being prelithiated at a relatively low constant C-rate in the relatively low potential range, the prelithiation of the soft carbon negative electrode could be completed, and the time period for prelithiation of the soft carbon negative electrode could be shortened.

TABLE 1

| Prelithiating method | | 1st cycle | 2nd cycle | 3rd cycle | 4th cycle | 5th cycle |
|---|---|---|---|---|---|---|
| CC | $C_s$(mAhg$^{-1}$) | 268 | 268 | 271 | 269 | 262 |
| | Coulombic efficiency(%) | 85.8 | 98.2 | 99.3 | 99.3 | 98.3 |
| 0.1 C + CV | $C_s$(mAhg$^{-1}$) | 260 | 260 | 261 | 260 | 260 |
| | Coulombic efficiency(%) | 85.2 | 98.5 | 99.2 | 99.2 | 99.2 |
| 0.5 C + CV | $C_s$(mAhg$^{-1}$) | 260 | 260 | 261 | 260 | 260 |
| | Coulombic efficiency(%) | 84.1 | 93.1 | 93.6 | 94.0 | 94.0 |

Note:
Coulombic efficiency = (capacity loss during a delithiating process/capacity gained during a prelithiating process) × 100%

Figure 4:
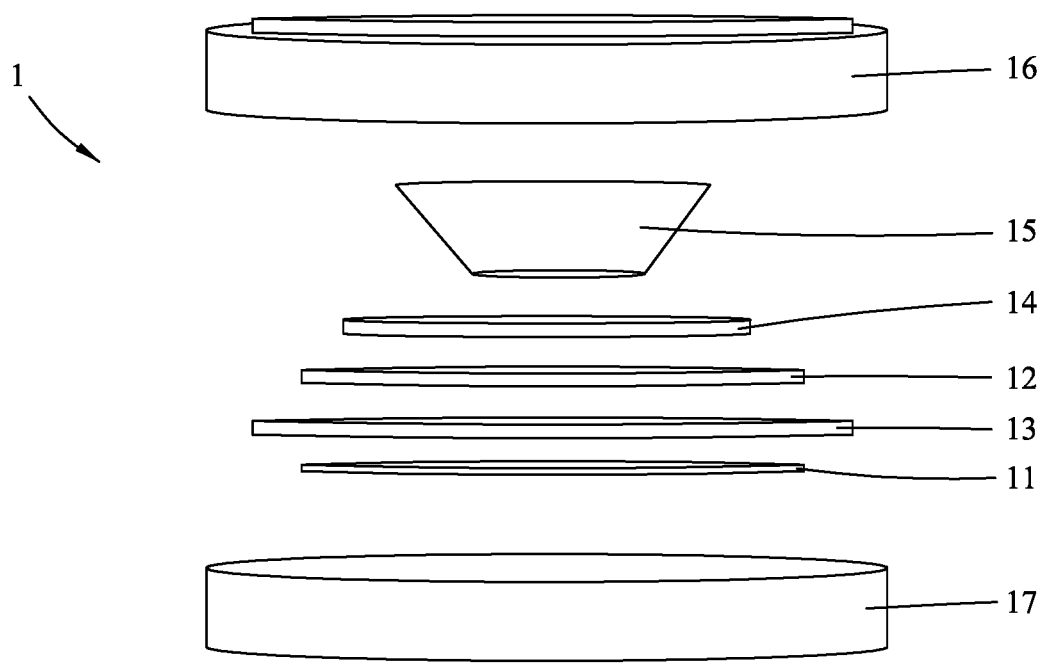
FIG. 4 is a schematic view illustrating a system for performing a prelithiation method according to the disclosure.

Based on the above, in accordance with some embodiments of the present disclosure, the following paragraphs provide a method for prelithiating a soft carbon negative electrode in a shorter time period. The method includes a prelithiating process. The prelithiating process may include steps a) to d). FIG. 4 illustrates a system 1 for performing the method in accordance with some embodiments of the disclosure. Please note that the elements in the system 1 are merely for schematic illustration and not drawn to scale.

In step a), in the system 1, the soft carbon negative electrode 11 and a lithium metal piece 12 are spaced apart from each other such that a lithium-containing electrolyte (not shown) is presented therebetween. The lithium metal piece 12 may serve as a Li/Li$^+$ reference electrode simultaneously. The system 1 is connected to an external power supply (not shown) so as to prelithiate the soft carbon negative electrode 11 in the following steps.

Referring to FIG. 4, in some embodiments, the system 1 includes the soft carbon negative electrode 11, the lithium metal piece 12, a separator 13 soaked with the lithium-containing electrolyte (not shown), a pad 14, a spring 15, an upper cap 16 and a lower cap 17.

The soft carbon negative electrode 11 and the lithium metal piece 12 are spaced apart from each other by the separator 13. The separator 13 is soaked with the lithium-containing electrolyte and allows the lithium-containing electrolyte to pass therethrough, and avoids physical contact between the soft carbon negative electrode 11 and the lithium metal piece 12.

In some embodiments, the lithium-containing electrolyte includes lithium hexafluorophosphate (LiPF$_6$) dissolved in a solvent. The solvent may include ethylene carbonate (EC), ethyl methyl carbonate (EMC), dimethyl carbonate (DMC), diethyl carbonate (DEC), and combinations thereof. In addition, the lithium-containing electrolyte may also include vinylene carbonate (VC) as an additive. In certain embodiments, the lithium-containing electrolyte includes 1 M of LiPF$_6$ dissolved in the solvent including EC, EMC and DMC in a volume ratio of 1:1:1, and 1 wt % of VC based on 100 wt % of the lithium-containing electrolyte. In other embodiments, the lithium-containing electrolyte includes 1 M of LiPF$_6$ dissolved in the solvent including EC and DMC in a volume ratio of 1:1. In some other embodiments, the lithium-containing electrolyte includes 1 M of LiPF$_6$ dissolved in the solvent including EC and DEC in a volume ratio of 1:1.

The pad 14, the spring 15, the upper cap 16 and the lower cap 17 may be made of any suitable materials, so as to facilitate prelithiation of the soft carbon negative electrode 11.

In step b), the soft carbon negative electrode 11 is prelithiated with a first constant current at a first constant C-rate until a voltage of the soft carbon negative electrode 11 is reduced to a first predetermined voltage that is not greater than 0.3 V vs. Li/Li$^+$ (voltages disclosed in the following disclosure are measured with reference to the Li/Li$^+$ reference electrode, and the soft carbon negative electrode 11 may have an initial voltage greater than 1.5 V vs. Li/Li$^+$ and not greater than 2 V vs. Li/Li$^+$). In some embodiments, the first constant C-rate is not greater than 5 C. In other embodiments, the first constant C-rate ranges from 0.5 C to 5 C. The first constant C-rate is not less than 0.5 C so as to ensure a reasonable time period for performing step b). The first constant C-rate is not greater than 5 C so as to ensure an effective prelithiation of the soft carbon negative electrode 11. In certain embodiments, the first predetermined voltage ranges from 0.1 V to 0.3 V vs. Li/Li$^+$. In other words, in step b), the soft carbon negative electrode 11 may be prelithiated at the first constant C-rate ranging from 0.5 C to 5 C until the first predetermined voltage ranging from 0.1 V to 0.3 V vs. Li/Li$^+$ is reached.

In step c), after step b), the soft carbon negative electrode 11 is prelithiated with a second constant current (smaller than the first constant current) at a second constant C-rate until the voltage of the soft carbon negative electrode 11 is reduced to a second predetermined voltage that is lower than the first predetermined voltage. In some embodiments, the second constant C-rate is not greater than 0.2 C and is less than the first constant C-rate. In other embodiments, the second constant C-rate ranges from 0.05 C to 0.2 C. In certain embodiments, the second predetermined voltage is not less than 0.01 V vs. Li/Li$^+$.

In step d), after step c), the soft carbon negative electrode 11 is prelithiated at a prelithiation constant voltage which is not greater than the second predetermined voltage, thereby completing prelithiation of the soft carbon negative electrode 11. In certain embodiments, the prelithiation constant voltage is the same as the second predetermined voltage. In some embodiments, step d) is conducted for a time period ranging from 0.5 hours to 24 hours, thereby completing prelithiation of the soft carbon negative electrode 11. In other embodiments, the soft carbon negative electrode 11 is prelithiated at the prelithiation constant voltage by a third (variable) current at a third (variable) C-rate. In some other embodiments, if the second constant C-rate is not less than 0.1 C, step d) is terminated when the third C-rate is less than 0.05 C, thereby completing prelithiation of the soft carbon negative electrode 11. In yet other embodiments, if the second constant C-rate is lower than 0.1 C, step d) is terminated when the third current is less than 50% of the second constant current, thereby completing prelithiation of the soft carbon negative electrode 11.

In some embodiments, if necessary, the method further includes a delithiating process after the prelithiating process. The prelithating/delithiating process may be repeated for a desired number of cycles, if necessary. In such case, step a), i.e., set up of the system 1 is omitted in the prelithating process of the repeated cycles (cycles performed after the first cycle).

In the method of the present disclosure, there are three different stages of prelithiating the soft carbon negative electrode 11, so as to force lithium ions to migrate into the soft carbon negative electrode 11, thereby completing prelithation of the soft carbon negative electrode 11. The three stages are respectively steps b), c), and d) as discussed in the foregoing. In steps b) and c), the soft carbon negative electrode 11 is first prelithiated by a higher constant current (higher C-rate), followed by a lower constant current (lower C-rate), and is then prelithiated by a prelithiation constant voltage in step d). By including numerous stages of prelithiating, the method of the present disclosure is capable of obtaining a prelithiated soft carbon negative electrode in a significantly short time period. In some embodiments, the prelithiation of the soft carbon negative electrode 11 is completed by performing the three stages of prelithiating once. That is, by performing one-time prelithiating that includes the aforementioned three stages, the prelithiation of the soft carbon negative electrode 11 is completed.

Figure 5:
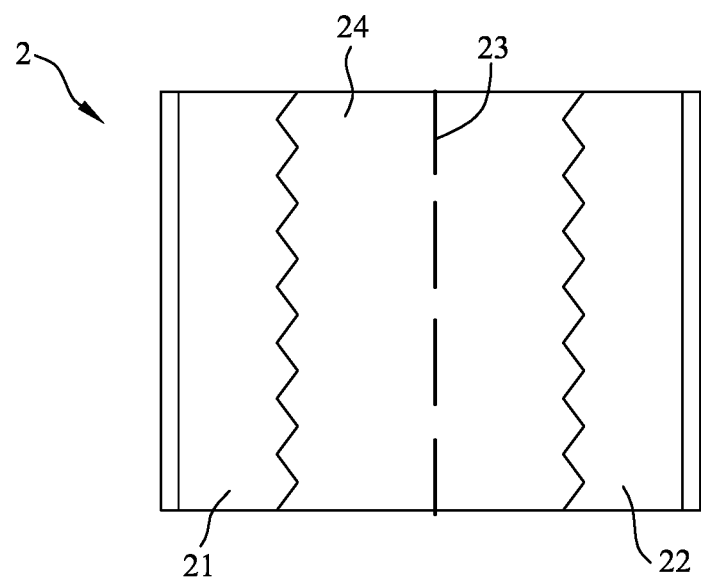
FIG. 5 is a schematic view illustrating an embodiment of an asymmetric lithium-ion supercapacitor including a negative electrode that is prelithiated by a method according to the disclosure.

The aforementioned prelithiated soft carbon negative electrode 11 may be used as a soft carbon negative electrode of a lithium-ion battery (not shown), or a soft carbon negative electrode 21 of an asymmetric lithium-ion supercapacitor 2 shown in FIG. 5. Referring to FIG. 5, the asymmetric lithium-ion supercapacitor 2 of the present disclosure includes the soft carbon negative electrode 21, a positive electrode 22 spaced apart from the soft carbon negative electrode 21, an electrolyte 24 and a membrane 23. The electrolyte 24 is disposed between the soft carbon negative electrode 21 and the positive electrode 22. The membrane 23 is disposed between the soft carbon negative electrode 21 and the positive electrode 22, and allows the electrolyte 24 to pass therethrough. In addition, the positive electrode 22 may include one of an activated carbon and an alkaline-activated soft carbon. The asymmetric lithium-ion supercapacitor 2 including the prelithiated soft carbon negative electrode 21 and the activated carbon-containing positive electrode 22 may be operated at a relatively high working voltage, such as approximately 3.8 V. In some cases, the asymmetric lithium-ion supercapacitor 2 may have an energy density that is at least twice as that of a symmetrical capacitor.

Examples of the disclosure will be described hereinafter. It is to be understood that these examples are exemplary and explanatory and should not be construed as a limitation to the disclosure.

<Preparation of a Prelithiation System>

A prelithiation system was prepared as described with reference to FIG. 4. The prelithaition system included a soft carbon negative electrode, a lithium metal piece, a separator soaked with an electrolyte, a pad, a spring, an upper cap and a lower cap.

The soft carbon negative electrode was formed by coating a slurry that includes a soft carbon, a carboxymethyl cellulose and a carbon-based conductive material (Vulcan XC-72) over a copper foil so that the soft carbon on the coated copper foil had a weight of 2 mg per square centimeter. The lithium metal piece was formed by cutting a lithium metal sheet (purchased from Ubiq Technology Co., Ltd.) into a disc having a diameter ranging from 10 mm to 12 mm. The separator was formed by soaking a membrane with the electrolyte. The electrolyte was prepared by dissolving 1 M of lithium hexafluorophosphate in a solvent including ethylene carbonate, ethyl methyl carbonate and dimethyl carbonate in a volume ratio of 1:1:1, and 1 wt % of vinylene carbonate based on 100 wt % of the electrolyte.

<Example 1> (E1)

The prelithiation system was subjected to a plurality of cycles of prelithiation/delithiation within a voltage ranging from of 0.01 V to 2 V. The soft carbon negative electrode had a voltage of 2 V vs. Li/Li$^+$ before prelithiating. During each delithiating, the soft carbon was delithiated at a rate of 0.1 C. During each prelithiating, the soft carbon negative electrode was, in stage (i), prelithiated at a first constant C-rate of 0.5 C (i.e., prelithiated at a first constant current) until reaching a first predetermined voltage of 0.3 V vs. Li/Li$^+$ (voltage values stated hereinafter are measured with reference to the Li/Li$^+$ reference electrode), and then in stage (ii), prelithiated at a second constant C-rate of 0.1 C (i.e., prelithiated at a second constant current) until reaching a second predetermined voltage of 0.01 V vs. Li/Li$^+$, followed by in stage (iii), being prelithiated at a prelithiation constant voltage of 0.01 V for 5 hours, thereby completing prelithation of the soft carbon negative electrode, and obtaining a prelithiated soft carbon negative electrode of E1. The stages (i), (ii), and (iii) are represented by the following expressions:

Stage (i) (prelithiated at 1$^{st}$ constant current):

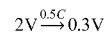

Stage (ii) (prelithiated at 2$^{nd}$ constant current):

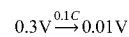

Stage (iii) (prelithiated at constant voltage):

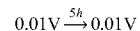

<Example 2> (E2)

Prelithiation of the soft carbon negative electrode of E2 was generally similar to that of E1, except that during each prelithiating, in stage (i), the first predetermined voltage was set at 0.1 V vs. Li/Li$^+$. The stages (i), (ii), and (iii) are represented by the following expressions:

Stage (i) (prelithiated at 1$^{st}$ constant current):

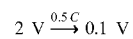

Stage (ii) (prelithiated at 2$^{nd}$ constant current):

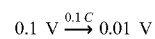

Stage (iii) (prelithiated at constant voltage):

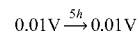

<Comparative Example 1> (CE1)

The procedures of CE1 differs from those of E1 in that there were only two stages in CE1. The two stages of prelithiating with two different constant currents in E1 (i.e., stages (i) and (ii) in E1), were replaced by a single stage of prelithiating with only one constant current in CE1 (i.e., stage (i) in CE1). Stage (ii) of CE1 remained the same as stage (iii) of E1. The stages (i), and (ii) of CE1 are represented by the following expressions:

Stage (i) (prelithiated at $1^{st}$ constant current):

$$2V \xrightarrow{0.1C} 0.01V$$

Stage (ii) (prelithiated at constant voltage):

$$0.01V \xrightarrow{5h} 0.01V$$

It should be noted that if coulombic efficiencies of the $2^{nd}$, $3^{rd}$, $4^{th}$ and $5^{th}$ cycles for the soft carbon negative electrode are high with little fluctuation, completion of the $1^{st}$ cycle prelithiating of the soft carbon negative electrode was regarded as completion of prelithiation of the soft carbon negative electrode. Time periods for completion of the $1^{st}$ cycle prelithiating of the soft carbon negative electrodes of E1, E2 and CE1 are shown in Table 2.

TABLE 2

|  |  | E1 | E2 | CE1 |
| --- | --- | --- | --- | --- |
| $1^{st}$ constant current stage | C-rate (C) | 0.5 | 0.5 | 0.1 |
|  | $1^{st}$ predetermined voltage (V) | 0.3 | 0.1 | 0.01 |
|  | Time period (hr) | 1.6 | 2.2 | 11.7 |
| $2^{nd}$ constant current stage | C-rate (C) | 0.1 | 0.1 | N/A |
|  | $2^{nd}$ predetermined voltage (V) | 0.01 | 0.01 | N/A |
|  | Time period (hr) | 8.7 | 5.2 | N/A |
| Time period for constant voltage stage (hr) |  | 5 | 5 | 5 |
| Total time period for the $1^{st}$ cycle prelithiating (hr) |  | 15.3 | 12.4 | 16.7 |

Note:
N/A = not applicable

Figure 6:
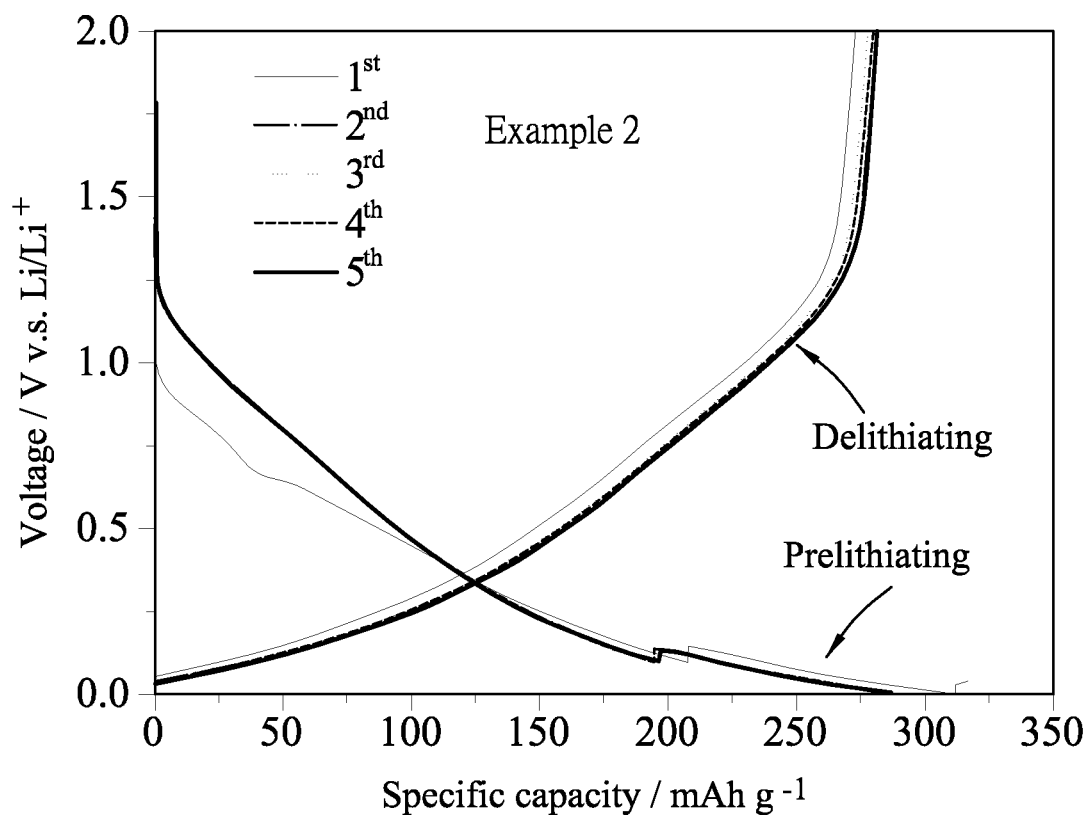
FIG. 6 is a plot of voltage against specific capacity of a certain soft carbon negative electrode that is prelithiated in Example 2.

It is found that, the $1^{st}$ cycle prelithiating of the soft carbon negative electrodes of E1 and E2 was completed earlier than that of CE1. In addition, the $1^{st}$ cycle prelithiating of the soft carbon negative electrode of E2 was completed earlier than that of E1. Prelithiating/delithiating curves of the soft carbon negative electrode of E2 are shown in FIG. 6. Based on the three stages performed to prelithiate the soft carbon negative electrode of E2, further investigations are performed to achieve optimization of parameters of each of the three stages. Details thereof are discussed in the following paragraphs.

Optimization of Time Period of Performing Stage (iii)

<Example 2-1> (E2-1)

Three samples of soft carbon negative electrodes, each of which was prelithiated in a similar manner as that of E2, except that stage (iii) was conducted for different time periods, i.e., 0.5 hour, 1 hour, and 2 hours, respectively. The delithiation capacities and coulombic efficiencies of the prelithiated soft carbon negative electrodes of the three samples and E2 are shown in Table 3.

TABLE 3

| Time period for constant voltage stage (hr) |  | $1^{st}$ cycle | $2^{nd}$ cycle | $3^{rd}$ cycle | $4^{th}$ cycle | $5^{th}$ cycle |
| --- | --- | --- | --- | --- | --- | --- |
| 0.5 | $C_s(mAhg^{-1})$ | 273 | 272 | 273 | 274 | 275 |
|  | Coulombic efficiency(%) | 84.3 | 97.8 | 98.4 | 98.7 | 98.6 |
| 1 | $C_s(mAhg^{-1})$ | 271 | 272 | 272 | 273 | 276 |
|  | Coulombic efficiency(%) | 82.5 | 96.9 | 97.6 | 97.7 | 97.6 |
| 2 | $C_s(mAhg^{-1})$ | 266 | 269 | 269 | 270 | 272 |
|  | Coulombic efficiency(%) | 84.1 | 95.9 | 96.4 | 96.7 | 96.3 |
| 5 | $C_s(mAhg^{-1})$ | 273 | 282 | 280 | 280 | 282 |
|  | Coulombic efficiency(%) | 84.1 | 97.3 | 97.9 | 98.0 | 97.6 |

Figure 7:
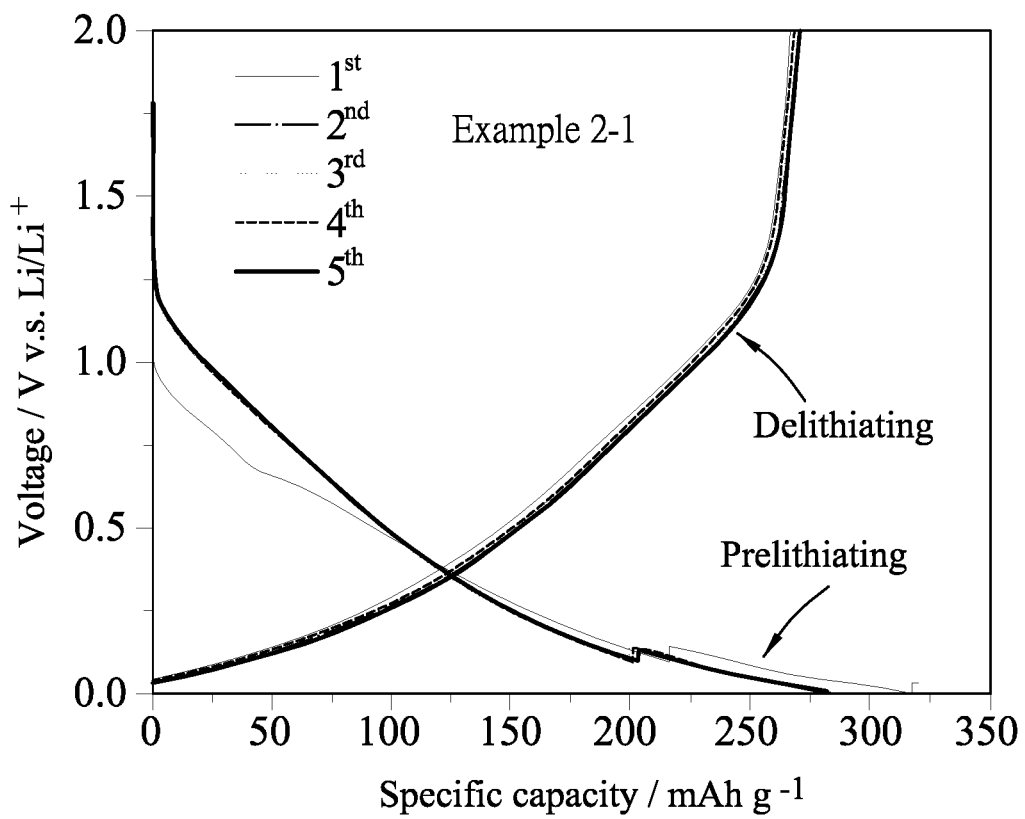
FIG. 7 is a plot of voltage against specific capacity of a still other soft carbon negative electrode that is prelithiated in Example 2-1.

Since coulombic efficiencies of the $2^{nd}$, $3^{rd}$, $4^{th}$ and $5^{th}$ cycles for each sample shown in Table 3 are high with little fluctuation, completion of the $1^{st}$ cycle prelithiating of the soft carbon negative electrode in each sample shown in Table 3 was regarded as completion of prelithiation of the soft carbon negative electrode. As shown in Table 3, prelithiation of the soft carbon negative electrodes (of all three samples and E2) completes when stage (iii) was conducted for a time period ranging from 0.5 hour to 5 hours. In addition, the time period ranging from 0.5 hour to 2 hours is sufficient for completion of stage (iii), and thus completing prelithiation of the soft carbon negative electrodes. In the following discussion, the aforesaid sample that was subjected to stage (iii) for 2 hours (the median among 0.5 hour, 1 hour, 2 hours and 5 hours) were taken as Example 2-1 (E2-1). Prelithiating/delithiating curves of the soft carbon negative electrode of E2-1 are shown in FIG. 7. The stages (i), (ii), and (iii) performed in prelithiation of the soft carbon negative electrode of E2-1 are represented by the following expressions:

Stage (i) (prelithiated at $1^{st}$ constant current):

$$2V \xrightarrow{0.5C} 0.1V$$

Stage (ii) (prelithiated at $2^{nd}$ constant current):

$$0.1V \xrightarrow{0.1C} 0.01V$$

Stage (iii) (prelithiated at constant voltage):

$$0.01V \xrightarrow{2h} 0.01V$$

Optimization of C-Rate of Stage (i)

<Examples 2-2, 2-3, and 2-4> (E2-2, E2-3, and E2-4)

The procedures in prelithiations of the soft carbon negative electrodes of E2-2, E2-3, and E2-4 were generally similar to those of E2-1, except that during each prelithiating, in stage (i), the soft carbon negative electrode was prelithiated at different C-rate, i.e., 1 C, 2 C, and 5 C, respectively. The delithiation capacities and coulombic efficiencies of the prelithated soft carbon negative electrodes of E2-1, E2-2, E2-3, E2-4 are shown in Table 4. Time periods for completion of different stages (in terms of prelithiating with different voltage level) of the 1st cycle prelithiating of the soft carbon negative electrodes of E2-1, E2-2, E2-3, E2-4 and CE1 are shown in Table 5.

TABLE 4

| Examples | | 1st cycle | 2nd cycle | 3rd cycle | 4th cycle | 5th cycle |
|---|---|---|---|---|---|---|
| E2-1 | $C_s(mAhg^{-1})$ | 266 | 269 | 269 | 270 | 272 |
|  | Coulombic efficiency(%) | 84.1 | 95.9 | 96.4 | 96.7 | 96.3 |
| E2-2 | $C_s(mAhg^{-1})$ | 279 | 283 | 281 | 282 | 277 |
|  | Coulombic efficiency(%) | 86.7 | 96.9 | 96.7 | 96.9 | 97.1 |
| E2-3 | $C_s(mAhg^{-1})$ | 265 | 270 | 273 | 275 | 275 |
|  | Coulombic efficiency(%) | 86.5 | 96.1 | 96.8 | 97.4 | 96.8 |
| E2-4 | $C_s(mAhg^{-1})$ | 278 | 283 | 286 | 288 | 288 |
|  | Coulombic efficiency(%) | 86.3 | 96.1 | 96.9 | 97.7 | 97.7 |

TABLE 5

| | | CE1 | E2-1 | E2-2 | E2-3 | E2-4 |
|---|---|---|---|---|---|---|
| 1st constant current stage | C-rate (C) | 0.1 | 0.5 | 1 | 2 | 5 |
|  | 1st predetermined voltage (V) | 0.01 | 0.1 | 0.1 | 0.1 | 0.1 |
|  | Time period (hr) | 11.7 | 2.2 | 1.0 | 0.4 | 0.1 |
| 2nd constant current stage | C-rate (C) | N/A | 0.1 | 0.1 | 0.1 | 0.1 |
|  | 2nd predetermined voltage (V) | N/A | 0.01 | 0.01 | 0.01 | 0.01 |
|  | Time period (hr) | N/A | 5.3 | 6.0 | 7.6 | 10.4 |
| Time period for constant voltage stage (hr) | | 5 | 2 | 2 | 2 | 2 |
| Total time period for 1st cycle prelithiating (hr) | | 16.7 | 9.5 | 9.0 | 10.0 | 12.5 |

Note:
N/A = not applicable

Figure 8:
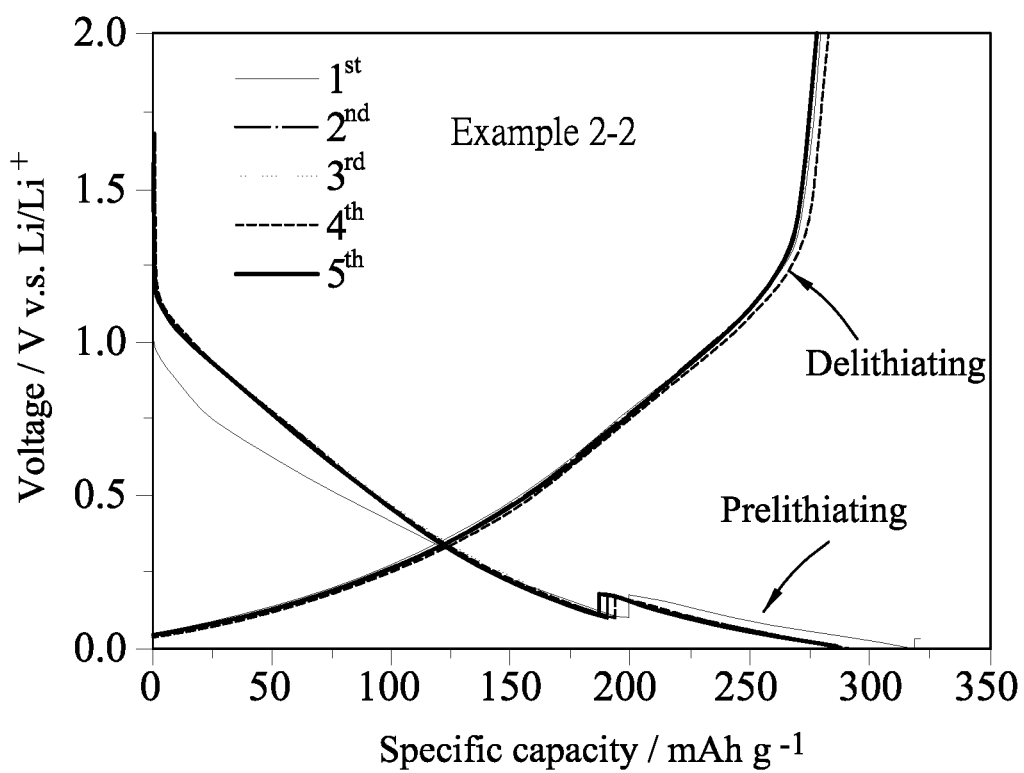
FIG. 8 is a plot of voltage against specific capacity of a yet other soft carbon negative electrode that is prelithiated in Example 2-2.

As shown in Tables 4 and 5, in the prelithiation of the soft carbon negative electrode of E2-2, in which stage (i) is performed by prelithiating the soft carbon negative electrode at 1 C, and stage (ii) is performed by prelithiating the soft carbon negative electrode at 0.1 C, the 1st cycle prelithiating is completed within the shortest time period, and is approximately 50% of the time period of the two-stage method (i.e., the prelithiation performed in CE1 using only a single stage of prelithiating with only one constant current, followed by prelithiating with one constant voltage). Prelithiating/delithiating curves of the soft carbon negative electrode of E2-2 are shown in FIG. 8. The stages (i), (ii), and (iii), performed in prelithiation of the soft carbon negative electrode of E2-2, are represented by the following expressions:

Stage (i) (prelithiated at 1st constant current):

$$2V \xrightarrow{1C} 0.1V$$

Stage (ii) (prelithiated at 2nd constant current):

$$0.1V \xrightarrow{0.1C} 0.01V$$

Stage (iii) (prelithiated at constant voltage):

$$0.01V \xrightarrow{2h} 0.01V$$

Optimization of C-Rate of Stage (ii)

<Examples 2-2-1, and 2-2-2> (E2-2-1, and E2-2-2)

The procedures in prelithiations of the soft carbon negative electrodes of E2-2-1, and E2-2-2 were generally similar to those of E2-2, except that during each prelithiating, in stage (ii), the soft carbon negative electrode was prelithiated at different C-rate, i.e., 0.05 C and 0.2 C, respectively. The delithiation capacities and coulombic efficiencies of the prelithated soft carbon negative electrodes of E2-2-1, and E2-2-2 are shown in Table 6. Time periods for completion of different stages (in terms of prelithiating with different voltage level) of the 1st cycle prelithiating of the soft carbon negative electrodes of E2-2-1, and E2-2-2 are shown in Table 7.

TABLE 6

| Examples | | 1st cycle | 2nd cycle | 3rd cycle | 4th cycle | 5th cycle |
|---|---|---|---|---|---|---|
| E-2-2-1 | $C_s(mAhg^{-1})$ | 287 | 286 | 286 | 289 | 287 |
|  | Coulombic efficiency(%) | 77 | 91 | 92 | 93 | 94 |
| E-2-2-2 | $C_s(mAhg^{-1})$ | 246 | 252 | 250 | 250 | 249 |
|  | Coulombic efficiency(%) | 100 | 94 | 95 | 96 | 96 |

TABLE 7

| | | E2-2-1 | E2-2-2 |
|---|---|---|---|
| 1st constant current stage | C-rate (C) | 1 | 1 |
|  | 1st predetermined voltage (V) | 0.1 | 0.1 |
|  | Time period (hr) | 0.98 | 0.74 |
| 2nd constant current stage | C-rate (C) | 0.05 | 0.2 |
|  | 2nd predetermined voltage (V) | 0.01 | 0.01 |
|  | Time period (hr) | 14.29 | 2.23 |
| Time period for constant voltage stage (hr) | | 2 | 2 |
| Total time period for 1st cycle prelithiating (hr) | | 17.27 | 4.97 |

Figure 9:
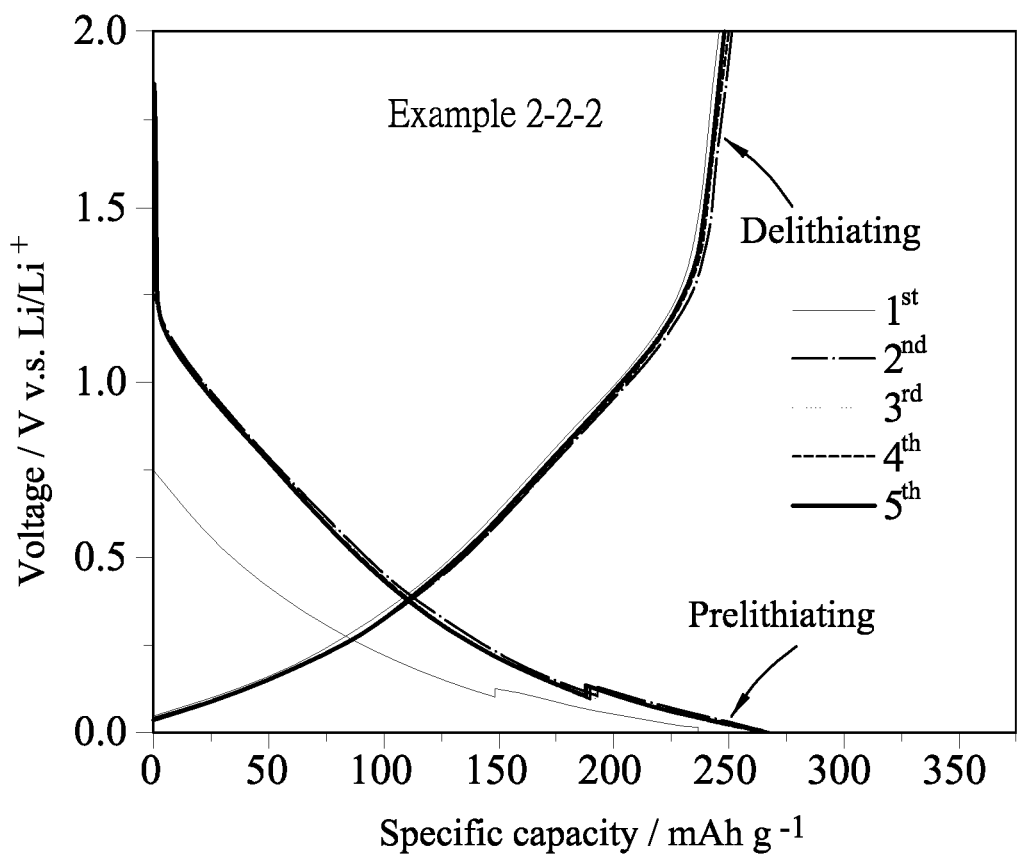
FIG. 9 is a plot of voltage against specific capacity of a yet another soft carbon negative electrode that is prelithiated in Example 2-2-2.

As shown in Tables 6 and 7, in the prelithiation of the soft carbon negative electrode of E2-2-2, in which stage (i) is performed by prelithiating the soft carbon negative electrode at 1 C, and stage (ii) is performed by prelithiating the soft carbon negative electrode at 0.2 C, the 1st cycle prelithiating is completed within the shortest time period. Prelithiating/delithiating curves of the soft carbon negative electrode of E2-2-2 are shown in FIG. 9. The stages (i), (ii), and (iii), performed in prelithiation of the soft carbon negative electrode of E2-2-2, are represented by the following expressions:

Stage (i) (prelithiated at 1st constant current)

$$2V \xrightarrow{1C} 0.1V$$

Stage (ii) (prelithiated at 2nd constant current):

$$0.1V \xrightarrow{0.2C} 0.01V$$

Stage (iii) (prelithiated at constant voltage):

$$0.01V \xrightarrow{2h} 0.01V$$

To conclude, in the method for prelithiating the soft carbon negative electrode according to the present disclosure, an electrochemical method which is capable of controlling degree of prelithiation is performed, and the prelithiation of the soft carbon negative electrode is completed within a significantly short period of time. In addition, such prelithiated soft carbon negative electrode may be applied in an asymmetric lithium-ion supercapacitor that has a relatively high working voltage.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and to equivalent arrangements.

What is claimed is:

1. A method for prelithiating a soft carbon negative electrode, comprising the steps of:
    a) disposing the soft carbon negative electrode and a lithium metal piece spaced apart from each other such that a lithium-containing electrolyte is present therebetween;
    b) prelithiating the soft carbon negative electrode at a first constant C-rate until a voltage of the soft carbon negative electrode is reduced to a first predetermined voltage that is not greater than 0.3 V vs. Li/Li$^+$, the first constant C-rate being not greater than 5 C;
    c) after step b), prelithiating the soft carbon negative electrode at a second constant C-rate until the voltage of the soft carbon negative electrode is reduced to a second predetermined voltage that is lower than the first predetermined voltage, the second constant C-rate being not greater than 0.2 C and being less than the first constant C-rate; and
    d) after step c), prelithiating the soft carbon negative electrode at a prelithiation constant voltage which is not greater than the second predetermined voltage, thereby completing prelithiation of the soft carbon negative electrode.

2. The method as claimed in claim 1, wherein the first constant C-rate ranges from 0.5 C to 5 C, and the first predetermined voltage ranges from 0.3 V to 0.1 V vs. Li/Li$^+$.

3. The method as claimed in claim 1, wherein the second constant C-rate ranges from 0.05 C to 0.2 C, and the second predetermined voltage is not less than 0.01 V vs. Li/Li$^+$.

4. The method as claimed in claim 1, wherein step d) is conducted for a time period ranging from 0.5 hour to 24 hours.

5. The method as claimed in claim 4, wherein the second predetermined voltage is the same as the prelithiation constant voltage.

6. The method as claimed in claim 1, wherein the soft carbon negative electrode is prelithiated in step b) by a first constant current, is prelithiated in step c) by a second constant current lower than the first constant current, and is prelithiated at the prelithiation constant voltage in step d) by a third current at a third C-rate.

7. The method as claimed in claim 6, wherein the second constant C-rate is not less than 0.1 C, and step d) is terminated when the third C-rate is less than 0.05 C.

8. The method as claimed in claim 6, wherein the second constant C-rate is lower than 0.1 C, step d) is terminated when the third current is less than 50% of the second constant current.

9. The method as claimed in claim 6, wherein the second predetermined voltage is the same as the prelithiation constant voltage.

* * * * *